United States Patent
Mayer

Patent Number: 6,050,085
Date of Patent: Apr. 18, 2000

[54] METHOD OF INJECTING A FIRST AND A SECOND FUEL COMPONENT AND INJECTION HEAD FOR A ROCKET

[75] Inventor: Wolfgang Mayer, Ellhofen, Germany

[73] Assignee: Deutsches Zentrum fuer Luft- und Raumfahrt e.V., Bonn, Germany

[21] Appl. No.: 08/989,626

[22] Filed: Dec. 12, 1997

[30] Foreign Application Priority Data

Dec. 12, 1996 [DE] Germany ............................ 196 51 646

[51] Int. Cl.[7] ................................ F02K 9/52; F02K 9/42
[52] U.S. Cl. ............................... 60/211; 60/257; 239/424; 239/424.5
[58] Field of Search .................................. 50/204, 211, 257, 50/258, 749; 239/403, 404, 424.5, 423, 424; 431/8, 10, 350

[56] References Cited

U.S. PATENT DOCUMENTS

| | | |
|---|---|---|
| 3,132,481 | 5/1964 | Hasbrouck et al. . |
| 3,447,316 | 6/1969 | White ........................................ 60/258 |
| 3,580,698 | 5/1971 | Goto ........................................ 431/255 |
| 3,611,722 | 10/1971 | Shick ........................................ 60/258 |
| 3,662,960 | 5/1972 | Mitchell et al. ........................... 60/258 |
| 3,664,588 | 5/1972 | Mitchell et al. . |
| 3,963,182 | 6/1976 | Rulseh ..................................... 239/404 |
| 4,139,157 | 2/1979 | Simmons ................................. 239/404 |
| 4,364,522 | 12/1982 | Reider ..................................... 239/399 |
| 4,621,492 | 11/1986 | Von Pragenau ........................... 60/258 |
| 4,707,982 | 11/1987 | Wagner .................................... 60/258 |
| 4,919,609 | 4/1990 | Sarkisian et al. ........................... 431/7 |
| 5,267,841 | 12/1993 | Culp et al. . |
| 5,323,753 | 6/1994 | Cikanek, Jr. et al. .................. 123/593 |
| 5,438,834 | 8/1995 | Vuillamy et al. . |
| 5,456,065 | 10/1995 | Dargies .................................... 60/258 |
| 5,704,551 | 1/1998 | Schmidt et al. . |

FOREIGN PATENT DOCUMENTS

| | | |
|---|---|---|
| 0 359 662 | 3/1990 | European Pat. Off. . |
| 0 740 063 | 10/1996 | European Pat. Off. . |
| 1 064 758 | 9/1959 | Germany . |
| 83 08 402 | 9/1984 | Germany . |
| 3328973 | 2/1985 | Germany ................................. 60/258 |
| 3432607 | 3/1986 | Germany ................................. 60/258 |
| 38 18 623 | 7/1989 | Germany . |
| 689 08 820 | 3/1990 | Germany . |
| 43 05 154 | 5/1994 | Germany . |
| 826861 | 1/1960 | United Kingdom . |

*Primary Examiner*—Ted Kim
*Attorney, Agent, or Firm*—Barry R. Lipsitz; Ralph F. Hoppin

[57] ABSTRACT

In order to improve a method of injecting a first and a second fuel component into a combustion chamber, particularly of a rocket engine, wherein an injection element guides the first fuel component in an inner cylindrical stream and the injection element guides the second fuel component in an annular stream surrounding the inner cylindrical stream, so that by comparison with known methods improved mixing and more homogeneous preparation of the fuel takes place on injection into the combustion chamber, it is proposed that in the injection element the first and/or the second fuel component is guided by an element which produces a pressure drop and is disposed and constructed in such a way that the energy released during the pressure drop is at least partially converted into turbulence energy of the stream of the first and/or the second fuel component in order to achieve a good intermixing of the two fuel components in the mixing zone.

46 Claims, 4 Drawing Sheets

METHOD OF INJECTING A FIRST AND A SECOND FUEL COMPONENT AND INJECTION HEAD FOR A ROCKET

The present disclosure relates to the subject matter disclosed in German Application No. 196 51 646.3 of Dec. 12, 1996, the entire specification of which is incorporated herein by reference.

The invention relates to a method of injecting a first and a second fuel component into a combustion chamber, particularly of a rocket engine, in which the first and the second fuel component are injected jointly into the combustion chamber by means of one or more injection elements, wherein one injection element guides the first fuel component in an inner cylindrical stream and allows it to flow out in such a cylindrical stream into a mixing zone, and wherein the injection element guides the second fuel component in an annular stream surrounding the inner cylindrical stream and allows it to flow out in such an annular stream into the mixing zone.

The invention further relates to an injection head for injecting a first and a second fuel component into a combustion chamber adjoining the injection head which has a plurality of injection elements which inject the first and the second fuel component jointly into the combustion chamber, wherein the injection elements guide the first fuel component into an inner cylindrical stream and allow it to flow out in such a cylindrical stream into a mixing zone, and guide the second fuel component in an annular stream surrounding the inner cylindrical stream and allow it to flow out in such an annular stream into the mixing zone.

Such methods and apparatus are known from the prior art.

They are used in particular for delivering and preparing propellants in rocket drives. In this case an injection head is usually formed by a large number of, for example several hundred, injection elements. The total mass flow of fuel is introduced through the injection head. The values which are definitive for the operation for example of an engine, such as mixing efficiency of the two fuel components, homogeneity and stability of the combustion as well as the thermal stress on the combustion chamber walls are determined essentially by the type of delivery and preparation of the fuel components through the injection head.

The object of the invention, therefore, is to provide a method which by comparison with known methods ensures improved mixing and more homogeneous preparation of the fuel during injection into the combustion chamber.

In the method according to the invention, this object is achieved according to the preamble to claim 1 in that in the injection element the first and/or the second fuel component is guided by an element which produces a pressure drop and is disposed and constructed in such a way that the energy released during the pressure drop is at least partially converted into turbulence energy of the stream of the first and/or the second fuel component in order to achieve a good intermixing of the two fuel components in the mixing zone.

The element which produces the pressure drop ensures an increase in the degree of turbulence of the first or second fuel component streaming into the combustion chamber, which ensures an improved mixing of the two components and thus a more homogeneous and more effective preparation of the fuel. Turbulence can be produced over an entire jet cross-section of the first or the second fuel component, so that in particular a proportion of fuel fluid streaming in the vicinity of an axis of symmetry of the inner cylindrical stream can also be better prepared without resulting in a significant expansion of the jet of fuel components streaming into the combustion chamber. This avoids increased thermal stress on the walls of the combustion chamber due to excessive expansion of the jet of fuel mixture.

Because of the improved mixing and preparation of the fuel streaming into the combustion chamber the combustion chambers can be built with a shorter length with the same degree of conversion, resulting in a saving of material which in the case of rocket engines leads in particular to a saving of weight.

In injection heads which are known from the prior art throttle elements are placed on the fuel supply side before the injection elements of the injection head and produce a pressure loss which serves to decouple the combustion chamber dynamically from the injection head in order to avoid possible vibrations (chugs) between the injection head and the combustion chamber which could disrupt the fuel supply to the combustion chamber and would thus reduce the efficiency of preparation. The method according to the invention makes it possible to dispense with such throttle elements since the element or elements producing the pressure drop act as such throttles, so that these elements also ensure improved preparation of the fuel.

In an advantageous embodiment of the method according to the invention it is provided that a free passage surface area of the element which produces the pressure drop and the turbulence and by which the inner cylindrical stream of the first fuel component is guided is approximately 30% to 60% and preferably approximately 40% to 50% of an inner cross-sectional surface of an inner pipe of the injection element ducting the cylindrical stream. This ensures that the pressure drop necessary for a decoupling of the injection head and the combustion chamber is produced and that the turbulence energy necessary for producing a turbulent flow is available.

This applies analogously when the free passage surface of the element which produces the pressure drop and the turbulence and by which the annular stream of the second fuel component is guided is approximately 30% to 60% and preferably approximately 40% to 50% of an annular surface of a ring pipe ducting the annular stream.

In this case the regions which do and do not allow through passage of an element which produces the pressure drop and the turbulence are disposed regularly so that turbulent vortices are produced uniformly over an entire flow cross-section.

In an embodiment of particularly simple construction the element which produces the pressure drop and the turbulence is a turbulence grid or grating. In this case the turbulence grid is favourably disposed in the stream so that the first and/or second fuel component is guided with a flow speed parallel to a surface normal of the turbulence grid surface. This likewise contributes to turbulent vortices being produced in the stream uniformly over the entire cross-sectional area of the stream, so that the mixing between the two fuel components is improved during injection into the combustion chamber.

In a variant of an embodiment grid bars which form the turbulence grid are aligned perpendicular and parallel to one another so that such a turbulence grid can be manufactured in a simple manner.

In order in this case to produce the pressure drop and turbulence in the stream to decouple the combustion chamber and the injection head, the thickness of a grid bar perpendicular to the direction of the stream is advantageously approximately 30% to 60% and preferably approximately 40% to 50% of an aperture width of the turbulence grid.

Hitherto no statements have been made about the arrangement of the turbulence grid. The turbulence grid or grids are advantageously disposed in the injection element in the vicinity of an end which opens into the combustion chamber so that dissipation and decay of the vortex produced by the turbulence grid or grids is still prevented before entry into the combustion chamber and mixing with the other fuel component.

In a favourable variant of an embodiment it is provided that the distance between the turbulence grid or grids and the end of the injection element which opens into the combustion chamber is in the range between nought to 120 times and preferably between 25 and 80 times the thickness of the grid lines perpendicular to the direction of the stream. By means of a minimum distance of the turbulence grid or grids from the end which opens into the combustion chamber it is ensured that the jet entering the combustion chamber is not expanded too greatly and by means of a maximum distance from the orifice on the combustion chamber side the vortex produced by the turbulence grid is prevented from decaying before it reaches the combustion chamber.

In order to achieve good mixing and preparation of the two fuel components during injection into the combustion chamber it is particularly advantageous if the second fuel component in the annular stream is guided at a higher speed than the first fuel component in the cylindrical stream, so that due to the difference in speed strong fluid-dynamic interactions are produced between the boundary surfaces of the first fuel component and the second fuel component during injection into the combustion chamber. In particular it is advantageous if the speed of the second fuel component is at least five times higher than the speed of the first fuel component and preferably approximately ten times higher.

In this case in a variant of an embodiment it is provided that the speed of the first fuel component in the cylindrical stream is between approximately 5 m/s and 40 m/s and preferably between approximately 7 m/s and 15 m/s.

In a particularly favourable variant of an embodiment the annular stream is coaxial with the cylindrical stream. As a result good mixing of the two fuel components is achieved with low construction costs.

In this case the first fuel component can be a liquid which is used in particular in liquid fuel rocket drives. The first fuel component is preferably an oxidant, particularly liquid oxygen, and the second fuel component is the fuel, for example gaseous hydrogen or liquid kerosene.

A further object of the invention is to provide an injection head which by comparison with known devices ensures improved mixing and more homogeneous preparation of the fuel during injection into the combustion chamber.

This object is achieved according to the invention by an injection head according to the preamble to claim 19 in that one or more turbulence-producing elements for producing turbulence in the cylindrical stream of the first fuel component and/or the annular stream of the second fuel component are disposed in an injection element in order to effect a good mixing between the first and second fuel components in the mixing zone.

In a particularly favourable embodiment the turbulence-producing element is constructed in such a way that it effects a pressure drop in the stream.

The injection head according to the invention has the advantages already set out in connection with the method according to the invention as claimed in claim 1.

Preferred embodiments of the injection head according to the invention are the subject matter of claims 20 to 39, the advantages of which have likewise been explained already in connection with the preferred embodiments of the method according to the invention as claimed in claims 2 to 16.

Figure 1:
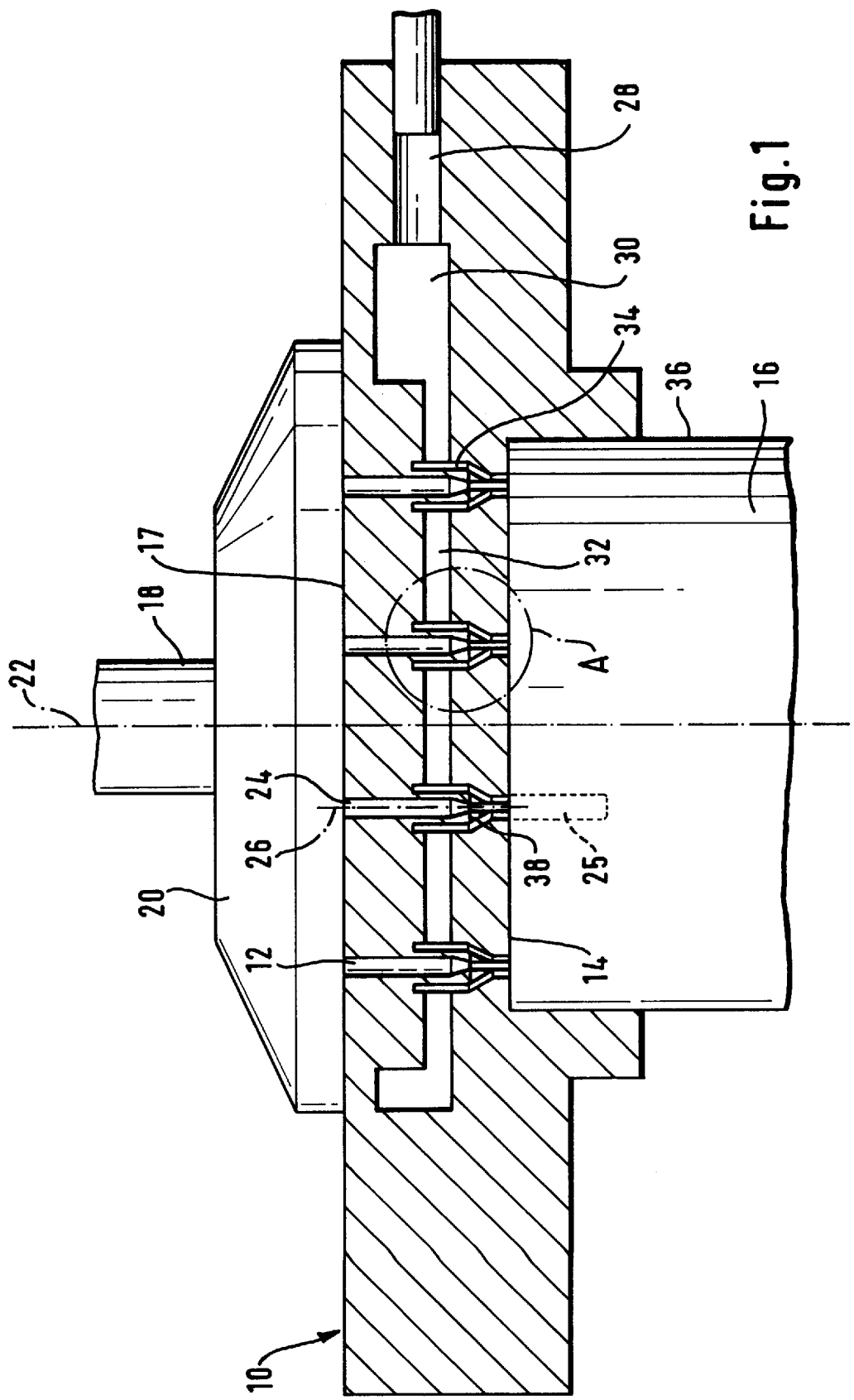
FIG. 1 shows a schematic sectional view of an embodiment of an injection head according to the invention.

An embodiment of an injection head according to the invention, which is denoted as a whole by 10 in FIG. 1, comprises a plurality of injection elements 12 by means of which a first fuel component and a second fuel component are injected into a combustion chamber 16 adjoining one end 14 on the outlet side, the injection elements 12 ensuring mixing of the two fuel components and preparation of the fuel.

An inlet end 17 remote from the outlet end 14 of the injection head 10 is connected by means of a pipe 18 to a tank (not shown in the drawing) for the first fuel component. It can also be provided that a pump (not shown in the drawing) which serves for application of pressure to the injection head 10 is disposed in the pipe 18.

This is for example liquid oxygen, which serves as oxidant for the fuel.

The pipe 18 opens into a cavity 20 which is disposed above the inlet end 17 of the injection head 10 and extends over a cross-section which encompasses all of the injection elements 12 of the injection head 10. The cavity 20 is preferably disposed so as to be rotationally symmetrical with respect to an axis 22 and the pipe 18 for the first fuel component is disposed coaxially with this axis 22 in order to guarantee the same supply to all injection elements with the first fuel component.

An injection element 12 comprises an inner pipe 24 which opens on the inlet end 16 of the injection head 10 into the cavity 20 and on the outlet end 14 into the combustion chamber 16. By means of such an inner pipe 24 the first fuel component is injected into the combustion chamber 16. In the combustion chamber 16 a mixing zone 25 (FIG. 1, FIG. 5) in which the two fuel components are mixed adjoins the outlet end 14 of the injection head 10 in each injection element 12.

An axis 26 of the inner pipe 24 is preferably parallel to the axis of symmetry 22.

In a variant of the injection head 10 according to the invention the injection elements 12 are disposed with their inner pipes 24 so that they lie coaxially with respect to the axis 22.

The inner pipe 24 is of cylindrical construction, so that the first fuel component entering the inner pipes 24 of the injection elements 12 via the fuel pipe 18 and the cavity 20 is guided into the inner pipes 24 in a cylindrical stream.

The injection head 10 according to the invention comprises a fuel pipe 28 which is connected to a tank (not shown in the drawing) for the second fuel component, which is for example gaseous hydrogen or liquid kerosene. It may also be provided that a pump (not shown in the drawing) for application of pressure to the injection head 10 is disposed in the fuel pipe 28 between the tank and the injection head 10. This second fuel constitutes the actual fuel which is prepared and burnt with the first fuel component which acts as oxidant. The fuel pipe 28 lies for example in a direction perpendicular to the direction of the axis 22 and opens into a supply unit 30 by means of which the second fuel component is delivered to the injection elements 12.

The supply unit 30 comprises a supply pipe 32 which is preferably disposed perpendicular to the axes 26 of the inner pipes 24 of the injection head 10.

The supply pipe 32 opens via connecting elements (not shown in the drawing) in each case into ring pipes 34 of the injection elements.

The ring pipe 34 of an injection element 12 is disposed so that it surrounds the inner pipe 24 of the injection element. An annular surface is formed between an outer face of the inner pipe 24 and an inner face of the ring pipe 34, the ring pipe 34 extending in the direction of the outlet end 14 of the injection head 10 towards the axis 26 of the injection element, so that an annular shell surface is formed. In a variant of an embodiment (FIG. 5) the annular shell surface is coaxial with the axis 26 of the inner pipe 24.

The second fuel component can be injected in an annular stream into the combustion chamber 16 through the annular shell surface of an injection element 12, the annular stream of the second fuel component surrounding the inner cylindrical stream of the first fuel component in the inner pipes 24 of the injection elements 12.

In this case the supply pipe 32 is preferably disposed so that the second fuel component is delivered uniformly to all injection elements 12 of the injection head 10.

The first fuel component is guided in a cylindrical stream by the inner pipes 24 of the injection elements 12 of the injection head 10 according to the invention and injected into the combustion chamber 16 which has a chamber casing 36 and is preferably constructed so as to be rotationally symmetrical about the axis 22. The second fuel component is injected in an annular stream surrounding the inner cylindrical stream of the first fuel component via the ring pipes 34. In the mixing zone 25 the two fuel components are mixed together. In this case the second fuel component is guided in the ring pipe 34 at a speed which is higher than the speed of the first fuel component in the cylindrical stream and in particular is approximately ten times higher in order during injection into the combustion chamber 16 to provide a difference in speed between the two respective streams. Due to this difference in speed between the stream of the first fuel component and the stream of the second fuel component fluid-dynamic interactions are produced between the two fuels during injection, so that mixing and preparation of the fuel entering the combustion chamber 16 is effected.

In order to achieve good mixing and preparation of the two fuels in this case one or more turbulence-producing elements 38 is disposed in each injection element 12 of the injection head according to the invention. In an injection element 12 a turbulence-producing element 38, which can in particular be a turbulence grid 40 (FIG. 3, FIG. 4), is disposed in the vicinity of an outlet end of the inner pipe 24 and/or in the vicinity of an outlet end of the ring pipe 34.

In his case the turbulence grid 40 is disposed so that the first fuel component is guided completely through the turbulence grid 40 (FIG. 2) and/or the annular stream of the second fuel component is guided completely through the associated turbulence grid (not shown in the drawing). This can be achieved in particular by a surface normal of the turbulence grid 40 being parallel to the axis 26 of the inner pipe 14.

Figure 2:
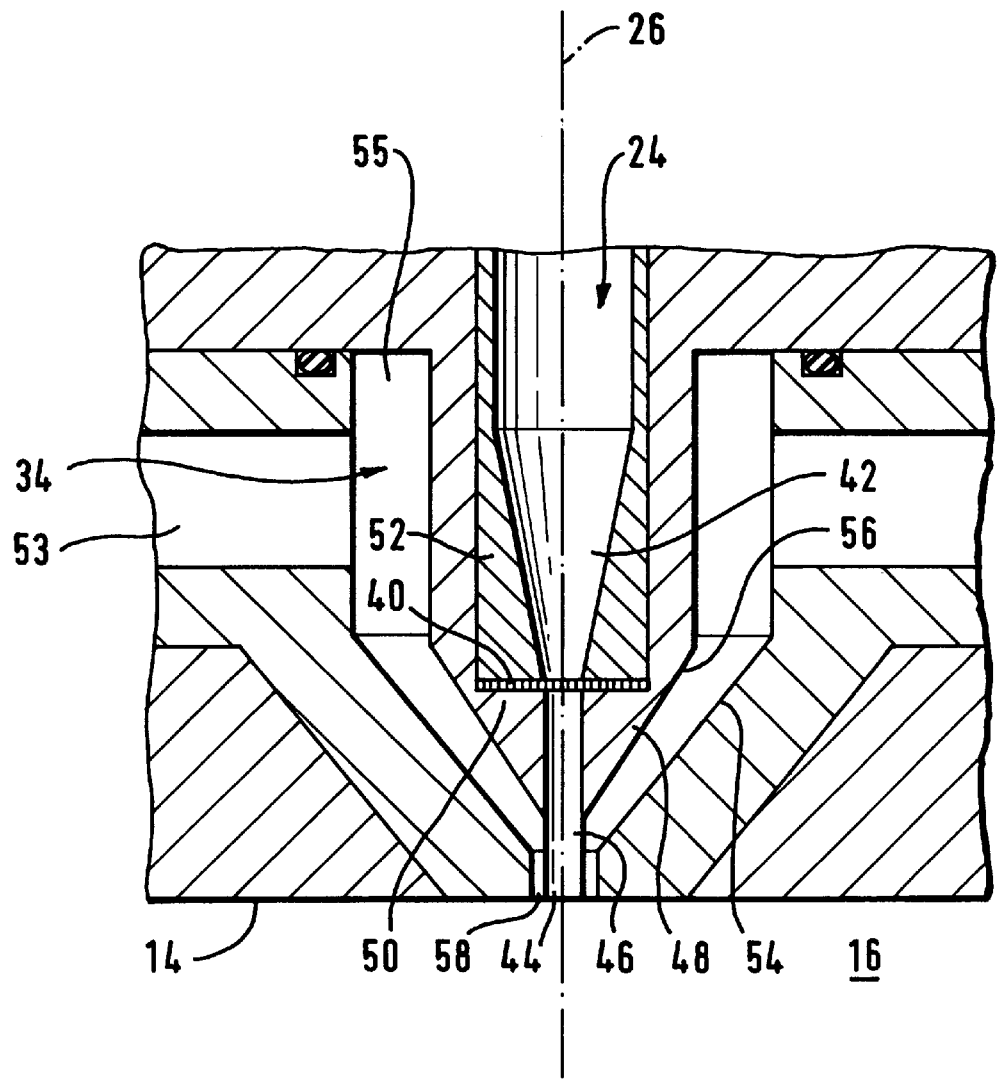
FIG. 2 shows an enlarged partial view of the region denoted by A in FIG. 1.

In a variant of an embodiment which is shown in FIG. 2, the inner pipe 24 has a narrowing 42 in the direction of the outlet end 14 of the injection head, so that a cross-section of an orifice 44 of the inner pipe 24 opening into the combustion chamber 16 has a smaller diameter than an orifice of the inner pipe 24 opening into the cavity 20 connected to the fuel pipe 18 for the first fuel component. The turbulence grid 40 is disposed on an end of the narrowing 42 facing the outlet end 14. The narrowing ensures that the speed of the first fuel component as it passes through the turbulence grid 40 is increased, so that an improved vorticity of the fuel fluid is achieved by an increase in the degree of turbulence.

The turbulence grid 40 which extends over the entire cross-sectional area of a portion 46 of the inner pipe 24 adjoining the narrowing 42 and opening into the combustion chamber 16 is inserted into a retaining element 48 so that the turbulence grid rests flat on retaining cheeks 50 of the retaining element 48. An insert element 52 by which the inner pipe 24 is held and which rests on the turbulence grid 40 ensures that the turbulence grid 40 is firmly gripped in the injection element 12.

In the variant of an embodiment which is shown in FIG. 2 it is provided that the second fuel component is delivered via a connecting element 53 through the supply pipe 32 (not shown in the drawing) to the ring pipe 34, the connecting element 53 opening into a part 55 of the ring pipe 34 which has an axis parallel to the axis 26 of the inner pipe 24. An outer shell surface 54 of the ring pipe 34 as well as an inner shell surface 56 of this ring pipe 34 taper in the direction of the orifice 44 of the inner pipe 24 towards the outlet end 14 of the injection element 12, and in this case in order to increase the discharge speed of the second fuel component the annular surface is reduced in the direction of the orifice 44 and an orifice 58 of the ring pipe 34 opening into the combustion chamber 16 surrounds the orifice 44 of the inner pipe 24.

Figure 3:
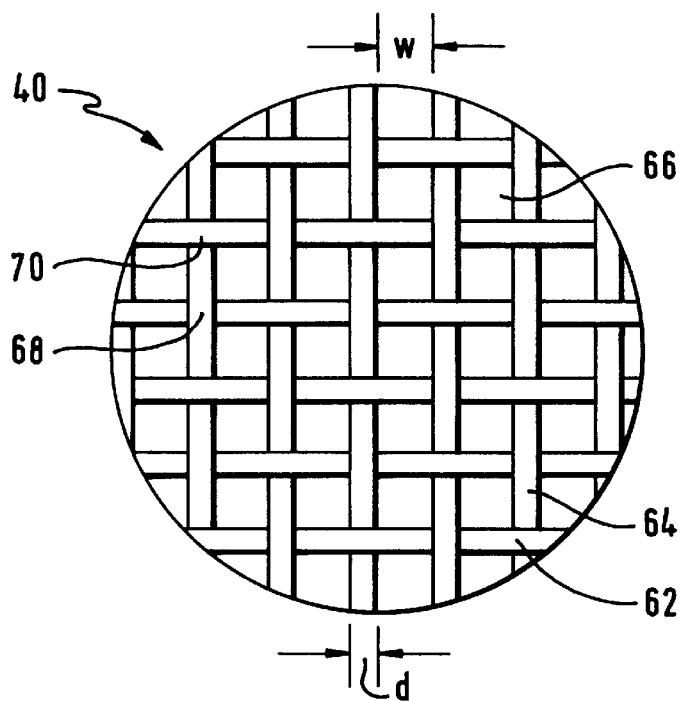
FIG. 3 shows a top view of a first embodiment of a turbulence grid.
Figure 4:
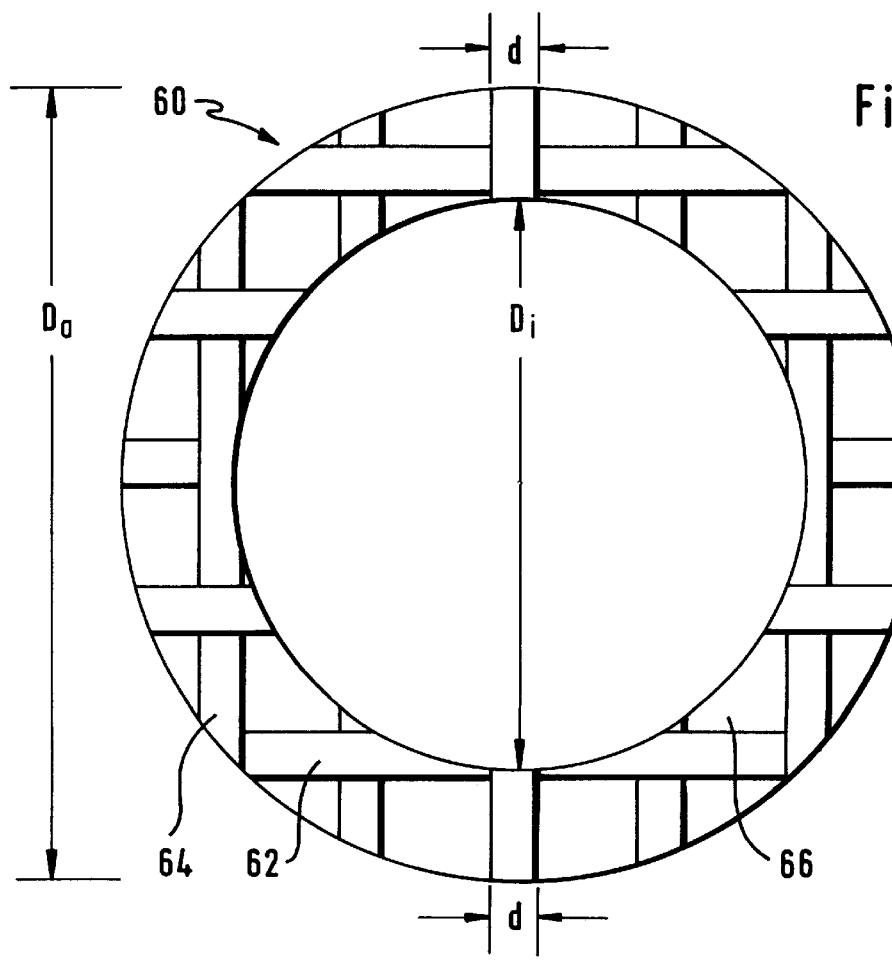
FIG. 4 shows a second embodiment of a turbulence grid.

In a variant of an embodiment, as shown in FIG. 3, the turbulence grid 40 or a turbulence grid 60 for the annular stream (FIG. 4) is formed of grid bars 62, 64 which are spaced and aligned parallel to one another and perpendicular to one another. By the arrangement of the grid bars 62, 64 a certain distance apart a through passage region for the stream is formed, this through passage region comprising individual apertures 66 with an aperture width w which is determined by the distance between the grid lines 62, 64. The grid bars 62, 64 are advantageously disposed like a woven structure, i.e. one grid bar extends alternately over 68 and under 70 the grid bars lying perpendicular to it. In this way the stability and the resistance to pressure of the turbulence grid is increased.

In an advantageous variant of an embodiment a free passage surface area of the turbulence grid 40 for the cylindrical stream is 30% to 60% and preferably 40% to 50% of the total cross-sectional area of the cylindrical stream directly on the turbulence grid 40. With a diameter D of the cylindrical inner pipe 24 (FIG. 5) the free passage surface area of the turbulence grid is then 30% to 60% and preferably 40% to 50% of the cross-sectional area of $\pi/4\ D^2$.

In the case of a turbulence grid 60 disposed in the ring pipe 34 the free passage surface area of the annular stream through the turbulence grid 60 is 30% to 60% and preferably 40% to 50% of the annular surface, which is $\pi/4\ (D_a^2 - D_i^2)$ with an outer internal diameter $D_a$ of the ring pipe and an inner external diameter $D_i$ of the ring pipe 34, the values $D_a$ and $D_i$ being based on the location at which the grid is disposed.

Due to such a construction of the turbulence grid 40 or 60 a pressure drop takes place in the cylindrical stream in the inner pipe 24 or in the annular stream in the ring pipe 34. This pressure drop effects a dynamic decoupling of the combustion chamber 16 from the injection head 10. This avoids vibrations in the combustion chamber 16 (chugs) being transmitted to the fuel throughput of the first fuel component or the second fuel component through the injection head and thus impairing the efficiency of the mixing and preparation of the two fuel components during injection into the combustion chamber and in turn impairing the transformation of energy during combustion.

The turbulence grid 40 is disposed at a distance x from the orifice 44 of the inner pipe 24 opening into the combustion chamber (FIG. 5), x being of the order of magnitude between nought times and 120 times and preferably between 25 times and 80 times the thickness d of the grid bars. In this way it is ensured on the one hand that the turbulence vortices which are produced when the cylindrical stream passes through the turbulence grid are not for the most part decayed again when they reach the orifice 44, smaller vortices dissipating and decaying more rapidly than large vortices. In this case the formation of small vortices is assisted by a small aperture size, the ratio between the thickness d of the grid lines and the aperture size w preferably being 30% to 60% and in particular 40% to 50%. On the other hand it is ensured that the fluid jet of the first or second fuel component is not too greatly expanded upon entry into the combustion chamber 16. If the turbulence grid 40 were disposed too close to the orifice 44, then the turbulent jet of the first fuel component would fan out too far, so that for example the chamber wall 36 of the combustion chamber 16 could be stressed when it is a question of an injection element disposed in the vicinity of the combustion chamber wall 36.

Figure 5:
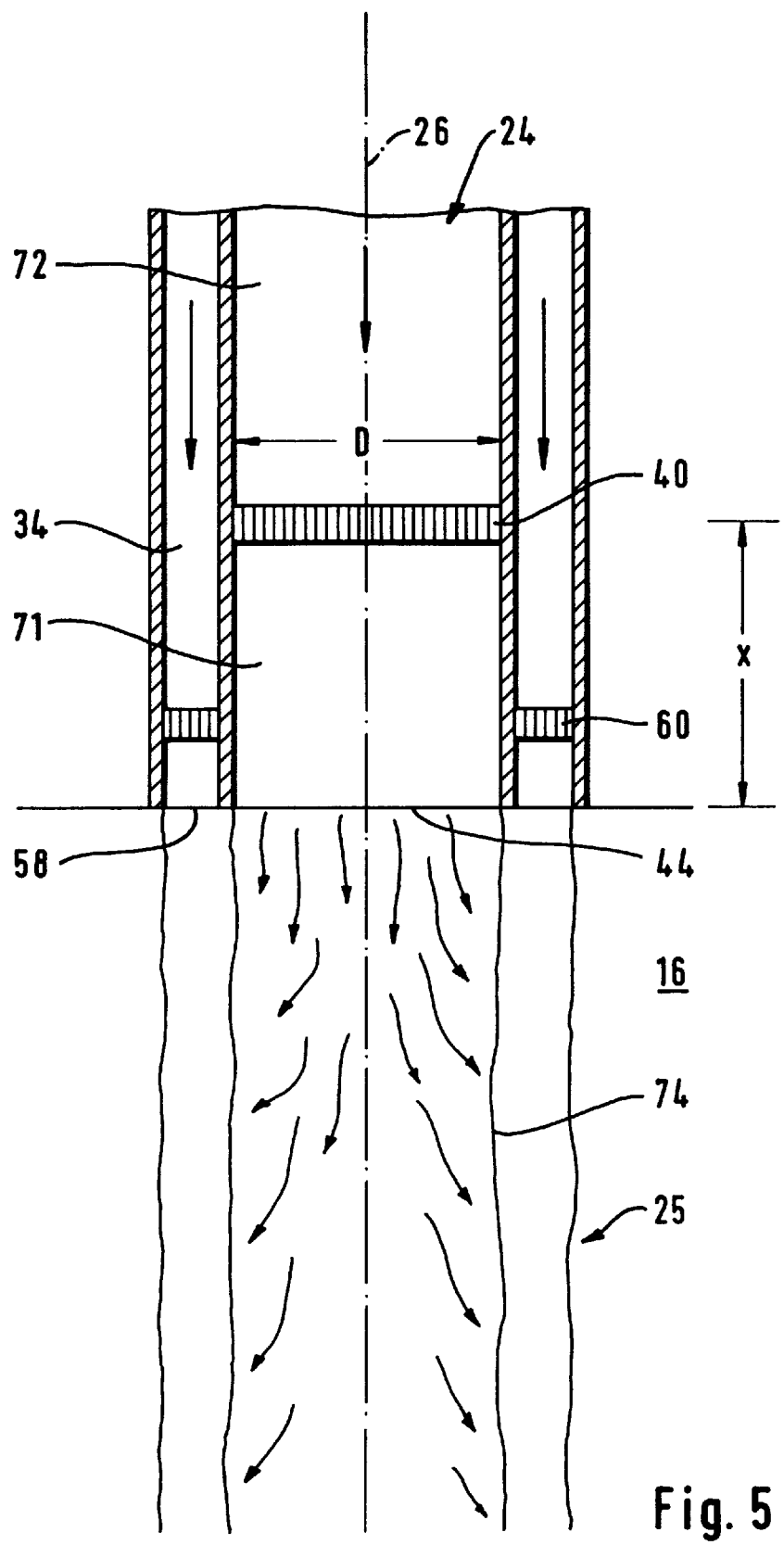
FIG. 5 shows a schematic illustration of the injection method according to the invention.

As shown schematically in FIG. 5 with reference to an individual injection element, the injection head according to the invention operates as follows:

The cylindrical stream of the first fuel component is guided in the inner pipe 24 through the turbulence grid 40 so that turbulent vortices are produced in the stream. This stream enters the combustion chamber 16 at the orifice 44. Because the free passage surface area is reduced as the first fuel component passes through the turbulence grid 40, a difference in pressure is formed between a part 71 of the inner pipe 24 facing the combustion chamber 16 and a part 72 of the inner pipe 24 facing the cavity 20, and this pressure difference effects a dynamic decoupling between the supply of the first fuel component and the combustion chamber 16.

The second fuel component in the ring pipe 34 streams in an annular stream and enters the combustion chamber via the orifice 58 of this annular stream. As it enters the combustion chamber this annular stream surrounds the cylindrical stream which has the turbulent vortices. In the mixing zone 25 the two fuel components are mixed together since fluid-dynamic interactions occur between these two streams at a boundary surface 74 and effect the mixing and preparation of the fuel.

This mixing and preparation is intensified by the turbulence vortices produced by means of the turbulence grid 40 and is also intensified by the fact that the flow speed of the second fuel component is higher than the flow speed of the first fuel component. In particular by the production of vortices by means of the turbulence grid 40 it is also ensured that fluid of the first fuel component streaming in the vicinity of the axis 26 of the inner pipe 24 is subjected to a component of motion perpendicular to the axis 26 and this moves towards the boundary surface 74 so that improved mixing with the second fuel component takes place over the entire flow cross-section.

In a variant of an embodiment it is provided that the diameter D of the inner pipe on the turbulence grid is between 1 and 15 mm, the speed for the first fuel component being between 5 m/s and 40 m/s and preferably between 7 m/s and 15 m/s. The distance between the turbulence grid 40 and the orifice 44 then amounts to between approximately 0 mm and 35 mm and preferably between 2 mm and 10 mm. For the aperture size w of the turbulence grid 40 or 60 it is provided that this is between 0.1 mm and 1.0 mm and preferably between 0.2 mm and 0.25 mm.

In order to achieve a free passage surface area between 30% and 60%, preferably between 40% and 50%, the wire thickness d is then between 0.05 mm and 0.3 mm and preferably between 0.08 mm and 0.12 mm.

In order to achieve improved mixing, in a variant of an embodiment according to the invention it is provided that a turbulence grid 60 is disposed in the ring pipe 34 in order to produce a turbulent stream for the second fuel component.

What is claimed is:

1. A method of injecting a first and a second fuel component into a combustion chamber of a rocket engine, comprising the steps of:

injecting the first and the second fuel components jointly into the combustion chamber by means of one or more injection elements, wherein one injection element guides the first fuel component in an inner cylindrical stream and allows it to flow out in such a cylindrical stream into a mixing zone, and wherein the injection element guides the second fuel component in an annular stream surrounding the inner cylindrical stream and allows it to flow out in such an annular stream into the mixing zone, and guiding in the injection element the first and/or the second fuel component through a turbulence grid which produces turbulence over an entire stream cross-section in order to achieve a good intermixing of the two fuel components in the mixing zone, wherein the turbulence grid produces a pressure drop and wherein the energy released during the pressure drop is at least partially converted into turbulence energy of the stream of the first and/or the second fuel component.

2. A method as claimed in claim 1, wherein a free passage surface area of the turbulence grid, by which the inner cylindrical stream of the first fuel component is guided, is about 30% to 60% of an inner cross-sectional surface of an inner pipe of the injection element ducting the cylindrical stream.

3. A method as claimed in claim 1, wherein a free passage surface area of the turbulence grid, by which the inner cylindrical stream of the first fuel component is guided, is about 40% to 50% of an inner cross-sectional surface of an inner pipe of the injection element ducting the cylindrical stream.

4. A method as claimed in claim 1, wherein the free passage surface area of the turbulence grid, by which the annular stream of the second fuel component is guided, is about 30% to 60% of an annular surface of a ring pipe ducting the annular stream.

5. A method as claimed in claim 1, wherein the free passage surface area of the turbulence grid, by which the annular stream of the second fuel component is guided, is about 40% to 50% of an annular surface of a ring pipe ducting the annular stream.

6. A method as claimed in claim 1, wherein regions which do and do not allow passage through the turbulence grid are disposed regularly.

7. A method as claimed in claim 1, wherein the turbulence grid is disposed in the stream so that the first and/or second fuel component is guided with a flow speed parallel to a surface normal to the turbulence grid surface.

8. A method as claimed in claim 1, wherein grid bars which form the turbulence grid are aligned perpendicular and parallel to one another.

9. A method as claimed in claim 8, wherein a grid bar which is perpendicular to the direction of the stream has a thickness which is about 30% to 60% of an aperture width of the turbulence grid.

10. A method as claimed in claim 8, wherein a grid bar which is perpendicular to the direction of the stream has a thickness which is about 40% to 50% of an aperture width of the turbulence grid.

11. A method as claimed in claim 1, wherein the turbulence grid or grids are disposed in the injection element near an end of the injection element which opens into the combustion chamber.

12. A method as claimed in claim 11, wherein the turbulence grid or grids and the end of the injection element which opens into the combustion chamber are separated by a distance in the range between about zero to 120 times the thickness of grid bars which are perpendicular to the direction of the stream.

13. A method as claimed in claim 11, wherein the turbulence grid or grids and the end of the injection element which opens into the combustion chamber are separated by a distance in the range between about 25 and 80 times the thickness of grid bars which are perpendicular to the direction of the stream.

14. A method as claimed in claim 1, wherein the second fuel component in the annular stream is guided at a higher speed than the first fuel component in the cylindrical stream.

15. A method as claimed in claim 14, wherein the second fuel component is guided at a speed which is at least five times higher than the speed of the first fuel component.

16. A method as claimed in claim 15, wherein the second fuel component is guided at a speed which is at approximately ten times higher than the speed of the first fuel component.

17. A method as claimed in claim 1, wherein the first fuel component in the cylindrical stream is guided at a speed which is between approximately 5 m/s and 40 m/s.

18. A method as claimed in claim 1, wherein the first fuel component in the cylindrical stream is guided at a speed which is between approximately 7 m/s and 15 m/s.

19. A method as claimed in claim 1, wherein the annular stream is coaxial with the cylindrical stream.

20. A method as claimed in claim 1, wherein the first fuel component is a liquid.

21. A method as claimed in claim 1, wherein the first fuel component is an oxidant.

22. A method as claimed in claim 21, wherein the second fuel component is the fuel.

23. An injection head of a rocket engine for injecting a first and a second fuel component into a combustion chamber adjoining the injection head, comprising:

a plurality of injection elements which inject the first and the second fuel components jointly into the combustion chamber, wherein the injection elements guide the first fuel component into an inner cylindrical stream and allow it to flow out in a cylindrical stream into a mixing zone, and guide the second fuel component in an annular stream surrounding the inner cylindrical stream and allow it to flow out in an annular stream into the mixing zone, and one or more turbulence grids for producing a pressure drop and producing turbulence over an entire stream cross-section in the cylindrical stream of the first fuel component and/or the annular stream of the second fuel component, in order to effect a good mixing between the first and second fuel components in the mixing zone, wherein the one or more turbulence grids are disposed in an injection element.

24. An injection head as claimed in claim 23, wherein a free passage surface area of the turbulence grid which is disposed in an inner pipe of the injection element ducting the inner cylindrical stream is about 30% to 60% of a cross-sectional surface area of the inner pipe.

25. An injection head as claimed in claim 23, wherein a free passage surface area of the turbulence grid which is disposed in an inner pipe of the injection element ducting the inner cylindrical stream is about 40% to 50% of a cross-sectional surface area of the inner pipe.

26. An injection head as claimed in claim 23, wherein a free passage surface area of the turbulence grid which is disposed in a ring pipe of the injection element ducting the annular stream is about 30% to 60% of an annular surface of the ring pipe.

27. An injection head as claimed in claim 23, wherein a free passage surface area of the turbulence grid which is disposed in a ring pipe of the injection element ducting the annular stream is about 40% to 50% of an annular surface of the ring pipe.

28. An injection head as claimed in claim 23, wherein regions which do and do not allow passage through the turbulence grid are disposed regularly.

29. An injection head as claimed in claim 23, wherein the turbulence grid is formed by a metal mesh.

30. An injection head as claimed in claim 29, wherein the turbulence grid is disposed in the stream so that a surface normal to the turbulence grid surface is parallel to the direction of flow of the first and/or second fuel component.

31. An injection head as claimed in claim 23, wherein grid bars which form the turbulence grid are aligned perpendicular and parallel to one another.

32. An injection head as claimed in claim 31, wherein a grid bar which is perpendicular to the direction of the stream has a thickness which is about 30% to 60% of an aperture width of the turbulence grid.

33. An injection head as claimed in claim 31, wherein a grid bar which is perpendicular to the direction of the stream has a thickness which is about 40% to 50% of an aperture width of the turbulence grid.

34. An injection head as claimed in claim 23, wherein the turbulence grid or grids are disposed in the injection elements near ends of the injection elements which open into the combustion chamber.

35. An injection head as claimed in claim 34, wherein the turbulence grid or grids and the end of the injection element which opens into the combustion chamber are separated by a distance in the range of about zero to 120 times the thickness of the grid bars perpendicular to the direction of the stream.

36. An injection head as claimed in claim 34, wherein the turbulence grid or grids and the end of the injection element which opens into the combustion chamber are separated by a distance in the range of about 25 and 80 times the thickness of the grid bars perpendicular to the direction of the stream.

37. An injection head as claimed in claim 23, wherein the annular stream is guided coaxially with the cylindrical stream in an inner pipe.

38. An injection head as claimed in claim 23, wherein the turbulence grid is disposed in each case in an inner pipe and in a ring pipe of the injection element ducting the annular stream.

39. An injection head as claimed in claim 23, wherein the second fuel component in the annular stream is guided at a higher speed than the first fuel component in the cylindrical stream.

40. An injection head as claimed in claim 39, wherein the second fuel component is guided at a speed which is at least five times higher than the speed of the first fuel component.

41. An injection head as claimed in claim 40, wherein the second fuel component is guided at a speed which is approximately ten times higher than the speed of the first fuel component.

42. An injection head as claimed in claim 23, wherein the first fuel component in the cylindrical stream is guided at a speed which is between approximately 5 m/s and 40 m/s.

43. An injection head as claimed in claim 23, wherein the first fuel component in the cylindrical stream is guided at a speed which is between approximately 7 m/s and 15 m/s.

44. An injection head as claimed in claim 23, wherein the first fuel component is a liquid.

45. An injection head as claimed in claim 23, wherein the first fuel component is an oxidant.

46. An injection head as claimed in claim 45, wherein the second fuel component is fuel.

* * * * *